US007751750B2

(12) United States Patent
Shoji

(10) Patent No.: US 7,751,750 B2
(45) Date of Patent: Jul. 6, 2010

(54) BELT UNIT INSTALLED APPARATUS, IMAGE FORMING APPARATUS HAVING THE SAME, AND METHOD OF INSTALLING/REMOVING BELT UNIT

(75) Inventor: Yuichi Shoji, Tokyo (JP)

(73) Assignee: Oki Data Corporation, Takasaki-shi, Gunma ( * ) Notice: Subject to any disclaimer, the term of this patent is extended or adjusted under 35 U.S.C. 154(b) by 496 days.

(21) Appl. No.: 11/730,179

(22) Filed: Mar. 29, 2007

(65) Prior Publication Data

US 2007/0231003 A1 Oct. 4, 2007

(30) Foreign Application Priority Data

Mar. 29, 2006 (JP) ............................ 2006-090115

(51) Int. Cl.
*B65G 21/20* (2006.01)
*G03G 21/16* (2006.01)

(52) U.S. Cl. ...................................... 399/121; 198/837

(58) Field of Classification Search ................. 399/116, 399/121, 124, 162, 298, 299, 302, 303, 312; 198/814, 837

See application file for complete search history.

(56) References Cited

U.S. PATENT DOCUMENTS 6,522,848 B2 * 2/2003 Wakana ...................... 399/121
2007/0025762 A1 * 2/2007 Kato et al. .................. 399/121

FOREIGN PATENT DOCUMENTS

JP 202-060039 2/2002

* cited by examiner

*Primary Examiner*—David M Gray
*Assistant Examiner*—Gregory H Curran
(74) *Attorney, Agent, or Firm*—Kubotera & Associates LLC

(57) ABSTRACT

A belt unit installed apparatus includes an apparatus frame; a belt unit attached to the apparatus frame, said belt unit having a first roller, a second roller, a belt placed between the first roller and the second roller, and a belt frame for supporting the first roller and the second roller; an engaging member disposed on the belt frame for engaging the apparatus frame; a receiving portion formed in the apparatus frame for engaging the engaging member; and an urging member disposed on the apparatus frame for urging the engaging member. The engaging member maintains an engagement state relative to the receiving portion when the engaging member engages the receiving portion.

20 Claims, 10 Drawing Sheets

BELT UNIT INSTALLED APPARATUS, IMAGE FORMING APPARATUS HAVING THE SAME, AND METHOD OF INSTALLING/REMOVING BELT UNIT

BACKGROUND OF THE INVENTION AND RELATED ART STATEMENT

The present invention relates to a belt unit installed apparatus, an image forming apparatus having the belt unit installed apparatus, and a method of installing/removing a belt unit.

As an example of a belt unit installed apparatus, in which a belt unit is installed, there is provided an image forming apparatus of electronic-photography type such as a printer, a copier, a facsimile, and a multifunction device.

In a conventional image forming apparatus such as a color printer, an image is formed through the following process. First, a charge roller charges a surface of a photosensitive drum. An exposure device such as an LED head exposes the surface of the photosensitive drum to form a static latent image or a latent image thereon. A developing roller attaches a thin layer of toner to the static latent image to form a toner image. A transfer roller transfers the toner image to a sheet. A fixing device fixes the toner image to the sheet, and the sheet is discharged. A cleaning blade scrapes off toner remaining on the photosensitive drum after the transfer roller transfers the toner image.

In the conventional image forming apparatus, the photosensitive drum, the charge roller, the developing roller, and the cleaning blade are combined in an image forming unit (ID unit or developing device). The image forming unit is disposed per color such as black, yellow, magenta, and cyan. A belt unit for transfer is disposed to face the photosensitive drum of each of the image forming units.

The belt unit is formed of a drive roller; a follower roller; a transfer belt placed between the drive roller and the follower roller to be freely movable; a transfer roller facing the photosensitive drum through the transfer belt; and the likes. The belt unit is detachably attached to the image forming apparatus, so that it is possible to easily perform maintenance, inspection, exchange, and the likes (refer to Patent Reference).

FIG. 2 is a schematic perspective view showing an attachment portion of a conventional belt unit. As shown in FIG. 2, the belt unit is attached to a frame 26 disposed on a main body of a printer or an apparatus main body. A bearing receiving portion 27 is disposed in the frame 26 at a specific position thereof. The belt unit has a bearing for supporting a drive roller to be freely rotatable.

When the belt unit is attached to the frame 26, the bearing engages the bearing receiving portion 27, and a gear 29 disposed on the apparatus main body engages a gear of the drive roller. A lock member 28 is disposed to be freely rotatable relative to the frame 26 for pushing the bearing from above, so that an upward movement of the bearing is restricted. A spring (not shown) urges the lock member 28 in an arrow direction A.

Patent Reference: Japanese Patent Publication No. 2002-60039

In the printer, when the belt unit is detached from the apparatus main body, the lock member 28 is moved with one hand of an operator, and the belt unit is pulled up while the other hand holds a handle attached to the belt unit. Accordingly, it is difficult to detach the belt unit from the printer.

In view of the problems described above, an object of the present invention is to provide a belt unit installed apparatus, in which it is possible to easily attach and detach a belt unit.

Further objects and advantages of the invention will be apparent from the following description of the invention.

SUMMARY OF THE INVENTION

In order to attain the objects described above, according to the present invention, a belt unit installed apparatus comprises an apparatus frame; a belt unit attached to the apparatus frame, said belt unit having a first roller, a second roller, a belt placed between the first roller and the second roller, and a belt frame for supporting the first roller and the second roller; an engaging member disposed on the belt frame for engaging the apparatus frame; a receiving portion formed in the apparatus frame for engaging the engaging member; and an urging member disposed on the apparatus frame for urging the engaging member. The engaging member maintains an engagement state relative to the receiving portion when the engaging member engages the receiving portion.

In the belt unit installed apparatus, when the belt unit is detached from the apparatus frame, the protruding member pushes the urging member away from the receiving portion. Accordingly, it is possible to easily attach and detach the belt unit.

DETAILED DESCRIPTION OF PREFERRED EMBODIMENTS

Hereunder, embodiments of the present invention will be explained with reference to the accompanying drawings. In the embodiments, a printer is used as an image forming apparatus for forming an image.

First Embodiment

Figure 3:
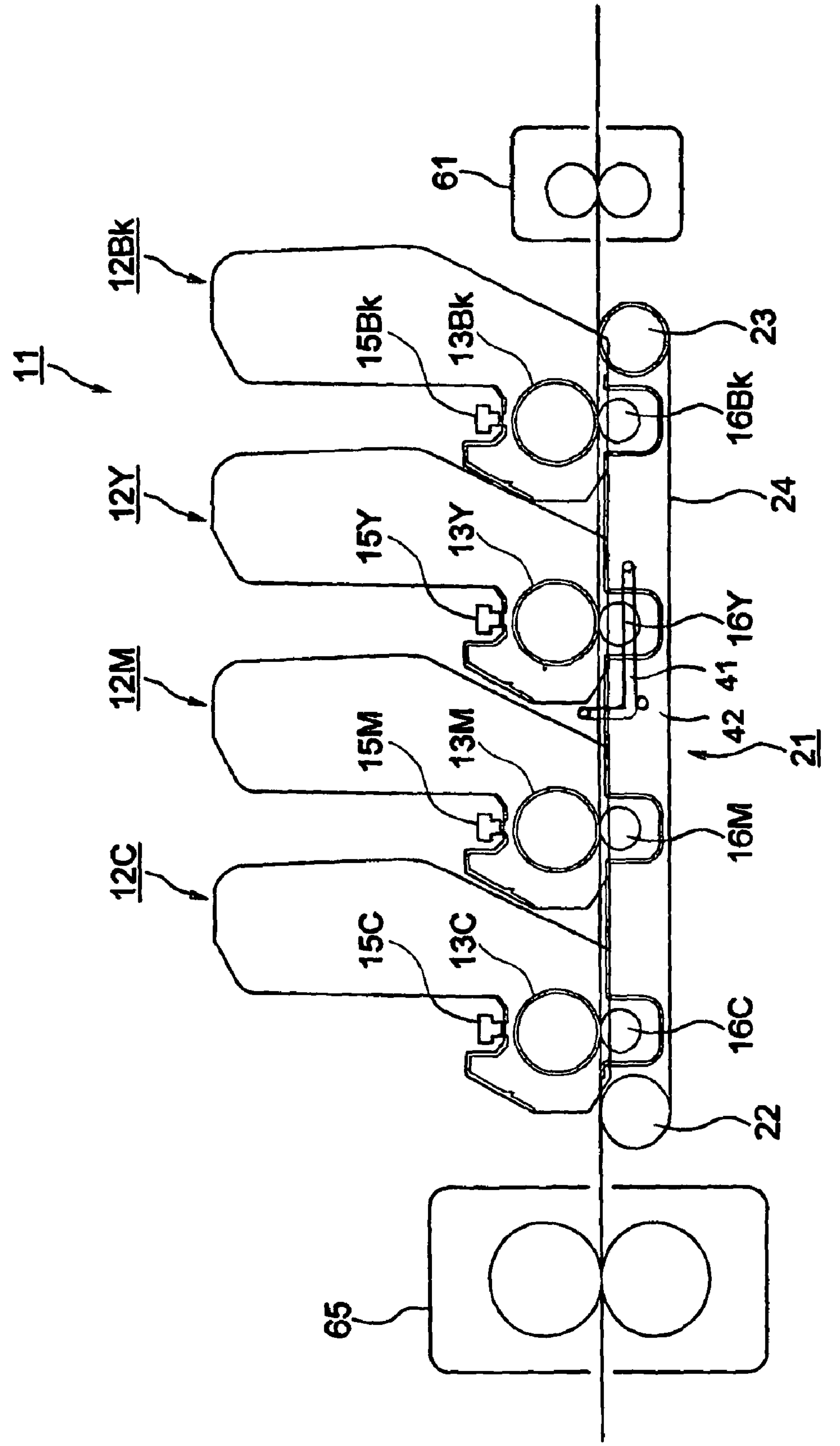
FIG. 3 is a schematic sectional view showing a printer according to the first embodiment of the present invention.

A first embodiment of the present invention will be explained. FIG. 3 is a schematic sectional view showing a color printer 11 according to the first embodiment of the present invention.

As shown in FIG. 3, the printer 11 includes image forming units 12Bk, 12Y, 12M, and 12C as image forming devices. The image forming units 12Bk, 12Y, 12M, and 12C are disposed in this order from an upstream side to a down stream side in a direction that a sheet as a recording medium is transported, and form developer images or toner images in black, yellow, magenta, and cyan, respectively.

The image forming units 12Bk, 12Y, 12M, and 12C include photosensitive drums 13Bk, 13Y, 13M, and 13C, and further include charge rollers (not shown), developing rollers (not shown), and cleaning blades (not shown) respectively contacting with the photosensitive drums 13Bk, 13Y, 13M, and 13C.

The charge rollers as charge devices uniformly and consistently charge surfaces of the photosensitive drums 13Bk, 13Y, 13M, and 13C. The developing rollers as developer supporting members hold toner as developer, and attach toner to the photosensitive drums 13Bk, 13Y, 13M, and 13C while rotating. The cleaning blades as cleaning devices remove toner remaining on the photosensitive drums 13Bk, 13Y, 13M, and 13C after the toner images are transferred.

In the embodiment, each of the developing roller is provided with components for forming an image such as a toner supply roller (not shown) as a developer supply member contacting with the developing roller for supplying toner and a developing blade having an end portion contacting with the developing roller for forming a uniform thin layer of toner on the developing roller. A developing device is formed of the developing roller, the toner supply roller, and the developing blade.

In the embodiment, LED heads 15Bk, 15Y, 15M, and 15C as exposing devices are provided to face the image forming units 12Bk, 12Y, 12M, and 12C for exposing the surfaces of the photosensitive drums 13Bk, 13Y, 13M, and 13C to form the latent images. A belt unit 21 is disposed to face the image forming units 12Bk, 12Y, 12M, and 12C for transferring the toner images in colors formed with the photosensitive drums 13Bk, 13Y, 13M, and 13C to the sheet to form a toner image in colors.

In the embodiment, the belt unit 21 includes a drive roller 22 as a first roller; a follower (idle) roller 23 as a second roller; a transfer belt 24 placed between the drive roller 22 and the follower roller 23 to be freely movable; and transfer rollers 16Bk, 16Y, 16M, and 16C facing the photosensitive drums 13Bk, 13Y, 13M, and 13C through the transfer belt 24 for forming an image. When the transfer belt 24 moves, the sheet is transported. In the drawings other than FIG. 3, the transfer rollers 16Bk, 16Y, 16M, and 16C are omitted for clear explanation.

In the embodiment, the charge rollers uniformly and consistently charge the surfaces of the photosensitive drums 13Bk, 13Y, 13M, and 13C. The LED heads 15Bk, 15Y, 15M, and 15C expose the surfaces of the photosensitive drums 13Bk, 13Y, 13M, and 13C according to image data, thereby forming the latent images on the photosensitive drums 13Bk, 13Y, 13M, and 13C. The developing rollers attach toner to the latent images to form the toner images. The transfer rollers 16Bk, 16Y, 16M, and 16C transfer the toner images to the sheet. The cleaning blades remove toner remaining on the photosensitive drums 13Bk, 13Y, 13M, and 13C after the toner images are transferred.

In the embodiment, a sheet supply unit 61 as a medium supply unit transports the sheet. When the sheet passes through between the photosensitive drums 13Bk, 13Y, 13M, and 13C and the transfer rollers 16Bk, 16Y, 16M, and 16C, the toner images in black, yellow, magenta, and cyan are sequentially transferred to the sheet, thereby forming the toner image in colors.

After transferring the toner images, the sheet is transported to a fixing device 65 as a fixing unit, so that the toner image in colors is fixed to the sheet. After the color image is formed on the sheet, the sheet is discharged outside the printer. The fixing device 65 includes a heating roller, a pressing roller, and the likes as components for forming an image.

Figure 4:
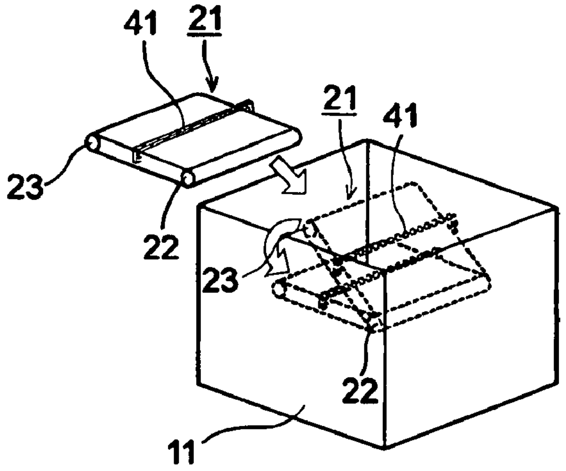
FIG. 4 is a schematic perspective view showing a method of attaching the belt unit to the printer according to the first embodiment of the present invention.
Figure 5:
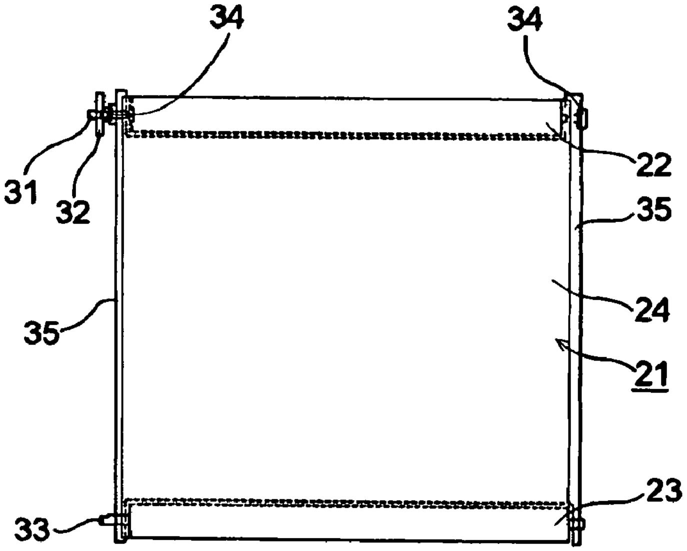
FIG. 5 is a schematic plan view showing the belt unit according to the first embodiment of the present invention.
Figure 6:
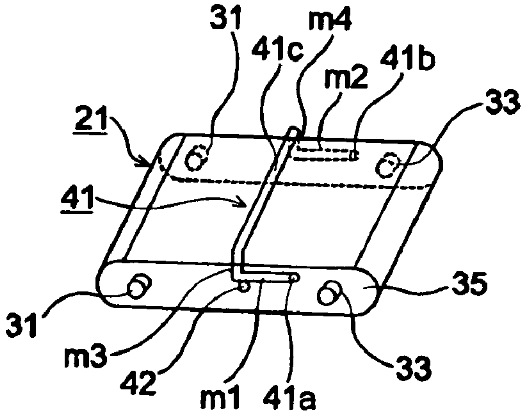
FIG. 6 is a schematic perspective view showing the belt unit according to the first embodiment of the present invention.
Figure 7:
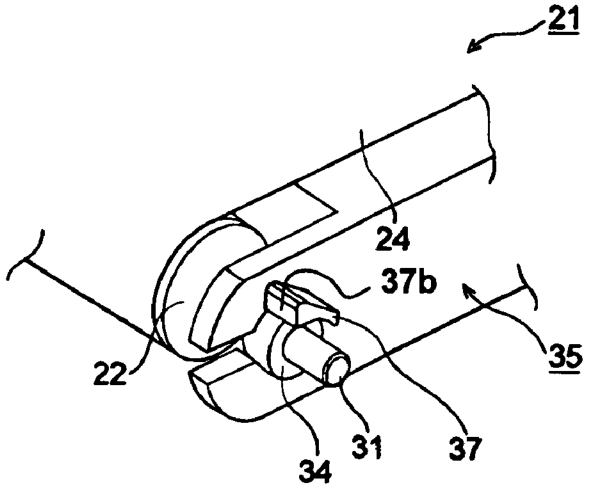
FIG. 7 is a schematic perspective view showing a primary portion of the belt unit according to the first embodiment of the present invention.

The belt unit 21 to be installed in the printer 11 will be explained next. FIG. 4 is a schematic perspective view showing a method of attaching the belt unit to the printer according to the first embodiment of the present invention. FIG. 5 is a schematic plan view showing the belt unit according to the first embodiment of the present invention. FIG. 6 is a schematic perspective view showing the belt unit according to the first embodiment of the present invention. FIG. 7 is a schematic perspective view showing a primary portion of the belt unit according to the first embodiment of the present invention.

As shown in FIG. 4, the belt unit 21 is detachably attached to the printer 11. As described above, the belt unit 21 includes the drive roller 22, the follower roller 23, the transfer belt 24, and the transfer rollers 16Bk, 16Y, 16M, and 16C (FIG. 3).

In the embodiment, the transfer belt 24 is formed of an endless belt having a width greater than a maximum print width of the printer 11. A cleaning device such as a blade (not shown) is disposed to face a specific portion of the transfer belt 24 for cleaning the transfer belt 24.

In the embodiment, the drive roller 22 has a surface formed of a material having high frictional resistance. As shown in FIG. 5, the drive roller 22 is attached to a shaft 31 provided with a gear 32. The gear 32 engages a gear (not shown) disposed in an apparatus main body, so that a drive device (not shown) drives the drive roller 22 to rotate, thereby moving the transfer belt 24. The shaft 31 is inserted into bearings 34 as shaft supporting members, and is supported on belt frames 35 as a unit frame (FIG. 7).

In the embodiment, the follower roller 23 is attached to a shaft 33 for applying tension to the transfer belt 24, so that the transfer belt 24 moves smoothly. Accordingly, the drive roller 22, the follower roller 23, and the transfer belt 24 are supported on the belt frames 35.

As shown in FIG. 7, the bearings 34 protrude outward from the belt frames 35, and the shaft 31 protrudes from the bearings 34. A protruding member 37 as a pressing device is disposed adjacent to the shaft 31 on at least one of the belt frames 35, and protrudes outward. The protruding member 37 has a pressing portion 37*b* for pressing a spring (described later) when the belt unit 21 is removed from the apparatus frame 35.

In the embodiment, the belt unit 21 is detachably attached to the apparatus main body for maintenance, inspection, or replacement. A handle 41 is provided between the belt frames 35 to be freely rotatable, and end portions 41*a* and 41*b* thereof are supported to be freely rotatable. As shown in FIG. 6, the end portions 41*a* and 41*b* are attached to the belt frames 35 at positions closer to the follower roller 23. Accordingly, when an operator holds the handle 41, the belt unit 21 is inclined such that a side of the follower roller 23 becomes an upper side and a side of the drive roller 22 becomes a lower side, as shown in FIG. 4.

In the embodiment, the handle 41 includes first arm members m1 and m2 extending from the end portions 41*a* and 41*b*, respectively, second arm members m3 and m4 extending perpendicularly from distal end portions of the first arm members m1 and m2, and a hand hook portion 41*c* connecting distal end portions of the second arm members m3 and m4. Accordingly, the handle 41 has a shape holding the belt unit 21.

Further, the handle 41 is rotatably supported on the belt frame 35 at the end portions 41*a* and 41*b*, so that the hand hook portion 41*c* can rotate up to the upper most position. When the operator does not hold the hand hook portion 41*c*, that is, the handle 41 is released, the handle 41 falls down toward the transfer belt 24 with own weight, and abuts against a stopper 42 to stop.

When the belt unit 21 is attached to the printer 11, the handle 41 abuts against the stopper 42. In the state that the handle 41 abuts against the stopper 42, the handle 41 is accommodated in a space between the image forming units 12Bk, 12Y, 12M, and 12C in the printer 11 and the belt unit 21. In this state, the handle 41 does not interfere with the image forming units 12Bk, 12Y, 12M, and 12C. Further, as shown in FIG. 3, the handle 41 is retained in a fallen state to form an enough space, so that the sheet passes through a handle portion 41*c* of the handle 41 and the transfer belt 24 without contacting with the handle portion 41*c*.

Figure 8:
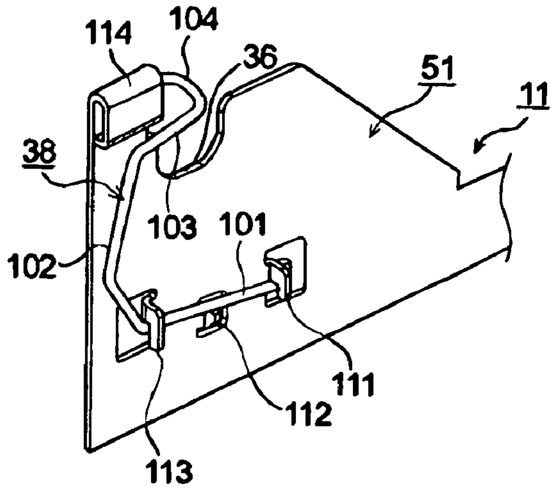
FIG. 8 is a schematic perspective view showing an attachment portion of the belt unit according to the first embodiment of the present invention.

FIG. 8 is a schematic perspective view showing an attachment portion of the belt unit 21 according to the first embodiment of the present invention.

As shown in FIG. 8, a frame 51 as an apparatus frame is disposed in the printer 11. The frame 51 has bearing receiving portions 36 having a U character shape at a front side and a rear side thereof. The bearing receiving portions 36 receive and hold the bearings 34 (FIG. 7).

In the embodiment, a spring 38 as an urging member is disposed adjacent to at least one of the bearing receiving portions 36 for pressing the bearing 34 from above with a specific force. Accordingly, in a state that the bearings 34 are held with the bearing receiving portions 36, the belt unit 21 does not come off due to vibrations and the likes associated with the rotation of the drive roller 22.

In the embodiment, the spring 38 is formed of stainless steel, and a part of the spring 38 faces the bearing receiving portion 36. As shown in FIG. 8, the spring 38 has a holding portion 101 extending in a substantially horizontal direction; an arm portion 102 extending upward from an end portion of the holding portion 101; a pressing portion 103 extending from an upper end portion of the arm portion 102 in a substantially horizontal direction for pressing the bearing 34; and a guide portion 104 extending from an end portion of the pressing portion 103 in a curved shape in an oblique direction for guiding the bearing 34.

In the embodiment, the frame 51 has supporting portions 111 and 113 formed as cut portions for supporting and holding from above both end portions of the holding portion 101, and a supporting portion 112 formed as a cut portion for supporting and holding from below a middle portion of the holding portion 101 between the supporting portions 111 and 113. Further, the frame 51 has a supporting portion 114 as a bent portion for supporting and holding from above an end portion of the guide portion 104.

A method of attaching the belt unit 21 will be explained next.

Figure 1:
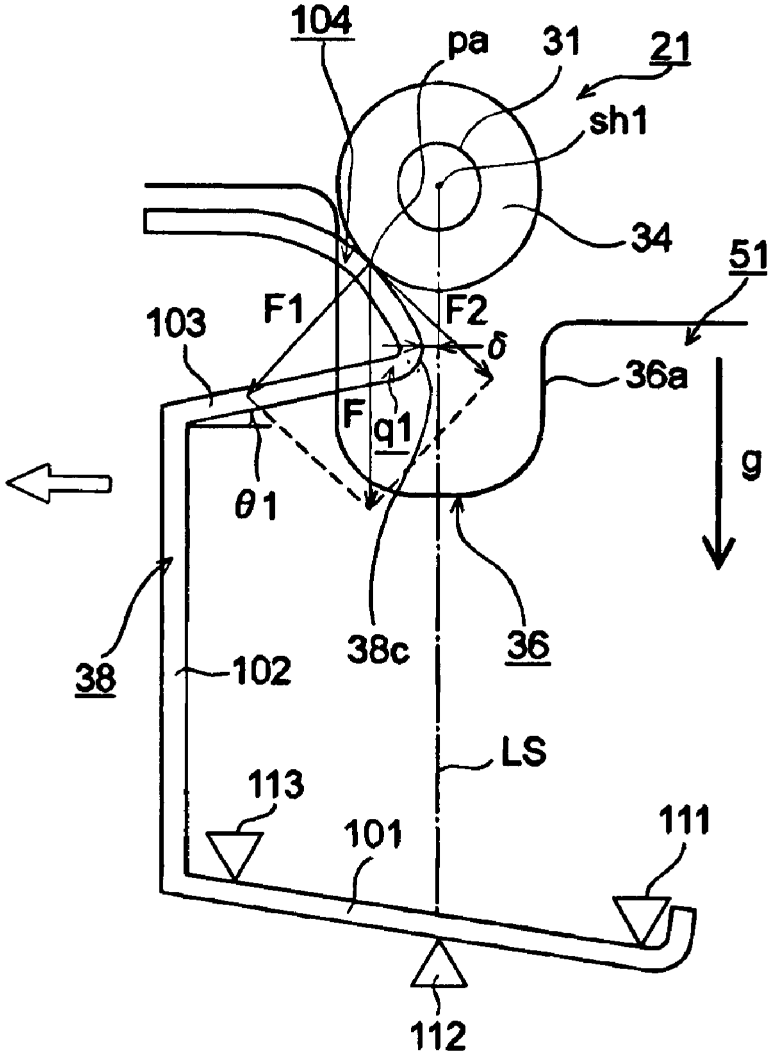
FIG. 1 is a schematic enlarged view No. 1 showing a belt unit in an attached state according to a first embodiment of the present invention.
Figure 2:
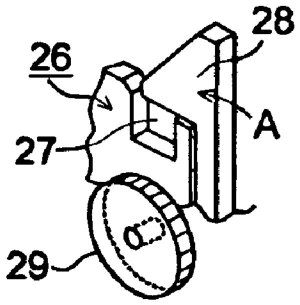
FIG. 2 PRIOR ART
FIG. 2 is a schematic perspective view showing a conventional belt unit.
Figure 9:
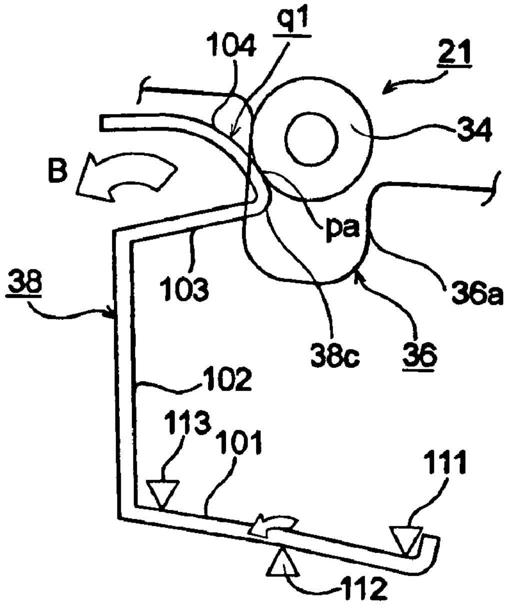
FIG. 9 is a schematic enlarged view No. 2 showing the belt unit in the attached state according to the first embodiment of the present invention.
Figure 10:
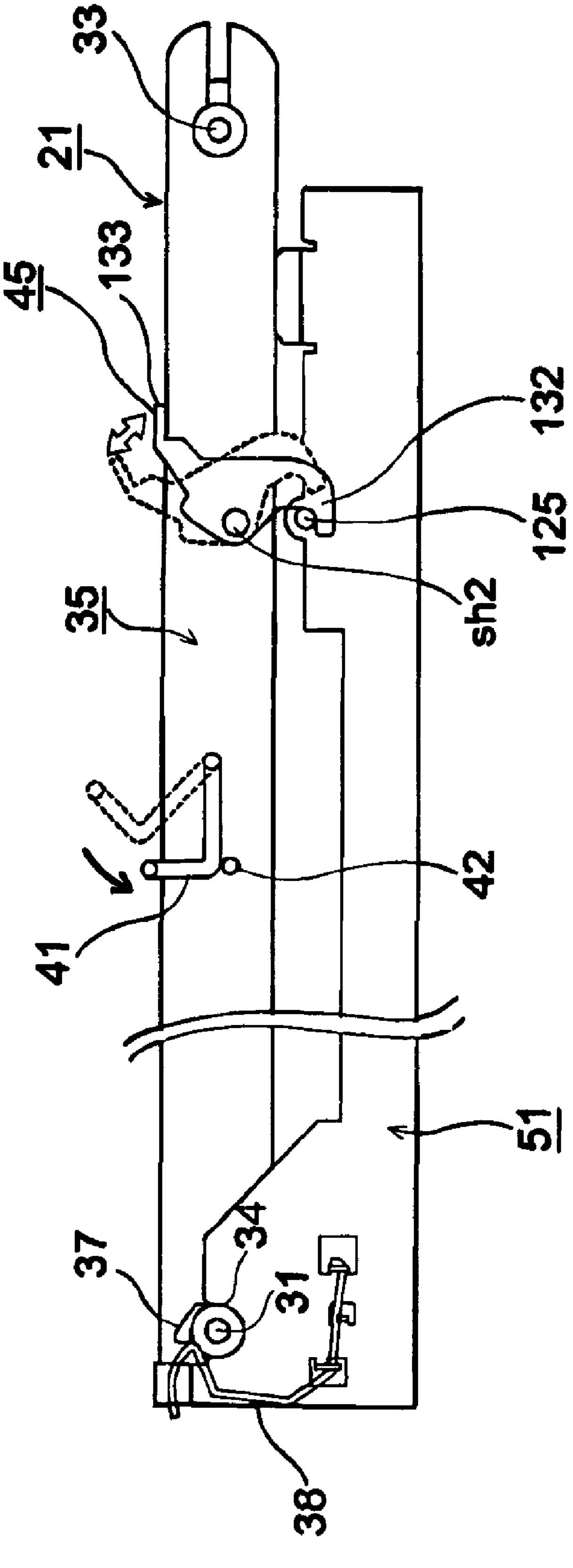
FIG. 10 is a schematic front view showing the belt unit in the attached state according to the first embodiment of the present invention.
Figure 11:
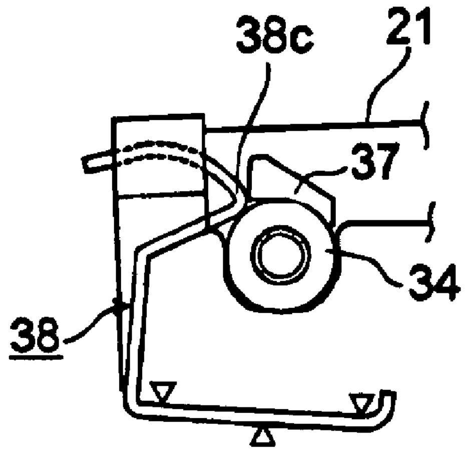
FIG. 11 is a schematic enlarged view No. 3 showing the belt unit in the attached state according to the first embodiment of the present invention.

FIG. 1 is a schematic enlarged view No. 1 showing the belt unit 21 in an attached state according to the first embodiment of the present invention. FIG. 9 is a schematic enlarged view No. 2 showing the belt unit 21 in the attached state according to the first embodiment of the present invention. FIG. 10 is a schematic front view showing the belt unit 21 in the attached state according to the first embodiment of the present invention. FIG. 11 is a schematic enlarged view No. 3 showing the belt unit 21 in the attached state according to the first embodiment of the present invention.

When the operator holds the handle 41 and lifts the belt unit 21, the belt unit 21 becomes in an inclined state with the drive roller 22 at a lower side and the follower roller 23 an upper side (FIG. 4), thereby making it easy to attach the belt unit 21 to the apparatus main body. When the bearings 34 enter the bearing receiving portions 36, and the belt unit 21 moves in an arrow direction g (FIG. 1), one of the bearings 34 contacts with the guide portion 104 of the spring 38. With no external force applied, the spring 38 is arranged such that a connecting portion q1 having a U character shape between the pressing portion 103 and the guide portion 104 faces the bearing receiving portion 36. In this state, a peak 38*c* of the connecting portion q1 is situated closer to the fixing device 65 relative to an imaginary line Ls between the supporting portion 112 and a center sh1 of the shaft 31, so that a specific distance $\delta$ is created between the peak 38*c* and the imaginary line Ls. Further, the pressing portion 103 is arranged in an angle $\theta 1$ relative to a horizontal direction such that the angle $\theta 1$ becomes equal to or less than 45 degrees ($\theta 1 \leqq 450$).

When the belt unit 21 moves further in the arrow direction g, the bearing 34 pushes the guide portion 104 toward outside the bearing receiving portion 36 against the force of the spring 38. At this time, a weight F of the belt unit 21 is applied to an abutting portion pa of the guide portion 104. As a result, a component force F1 is applied in a direction perpendicular to a tangential direction between the bearing 34 and the guide portion 104, and a component force F2 is applied in the tangential direction between the bearing 34 and the guide portion 104.

At this moment, since the abutting portion pa is situated closer to the fixing device 65 relative to the imaginary line Ls, the abutting portion pa moves in an arrow direction B with the component force F1 as shown in FIG. 9, so that the connecting portion q1 is pushed out of the bearing receiving portion 36. When a space between the peak 38*c* and a wall surface 36*a* of the bearing receiving portion 36 becomes equal to an outer diameter of the bearing 34, the bearing 34 passes through the space and is set in the bearing receiving portion 36. Accordingly, the belt unit 21 is attached to the frame 51.

Afterward, the spring 38 rotates in a direction opposite to the arrow direction B due to a restoration force thereof. The peak 38*c* stops at a position pressing a specific location of an outer circumference of the bearing 34 to push the outer circumference of the bearing 34 with a specific force. In this case, since the angle θ1 is smaller than 45°, it is possible to press the bearing 34 on the spring 38 with a large force (FIG. 11). Accordingly, it is possible to prevent the bearings 34 from coming off the bearing receiving portions 36.

After the state described above is achieved, the operator rotates the belt unit 21 around the bearing receiving portions 36. Then, as shown in FIG. 10, the operator places the belt unit 21 on the frame 51 in a horizontal state, and operates a lock member 45 to lock the belt unit 21 to the frame 51. At this moment, as shown in FIG. 11, the peak 38*c* of the spring 38 abuts against the bearing 34 from above, and pushes the bearing 34 toward the bearing receiving portion 36.

In the embodiment, the lock member 45 is disposed to be freely rotatable around a shaft sh2 disposed in the belt frames 35. The lock member 45 has a hook 132 as an engaging portion at a lower end thereof and a knob portion 133 at an upper end thereof. The frame 51 has a pin 125 as an engaging portion at a specific position.

When the operator operates the knob portion 133 and pushes the knob portion 133 downward, the lock member 45 rotates around the shaft sh2. Accordingly, the hook 132 engages the pin 125, so that the belt unit 21 is locked to the frame 51. When the operator operates the knob portion 133 and pulls the knob portion 133 upward, the lock member 45 rotates around the shaft sh2. Accordingly, the hook 132 is released from the pin 125, so that the belt unit 21 is unlocked from the frame 51. When the operator releases a hand thereof from the handle 41, the handle 41 falls down in an arrow direction in FIG. 10. The handle 42 stops upon contacting with the stopper 42.

A method of detaching the belt unit 21 from the printer 11 will be explained next.

Figure 12:
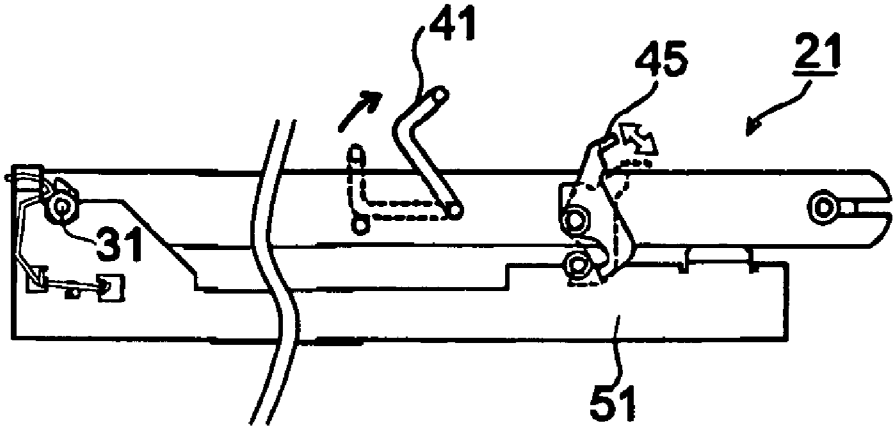
FIG. 12 is a schematic front view No. 1 showing a method of detaching the belt unit from the printer according to the first embodiment of the present invention.
Figure 13:
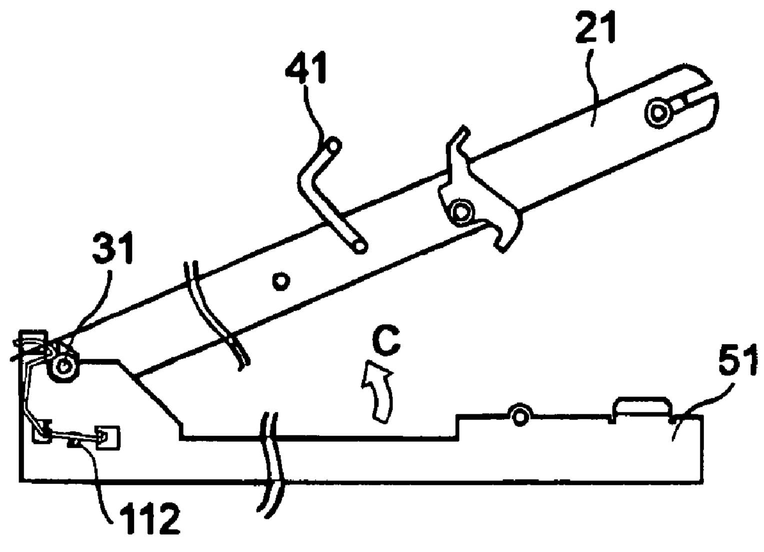
FIG. 13 is a schematic front view No. 2 showing the method of detaching the belt unit from the printer according to the first embodiment of the present invention.
Figure 14:
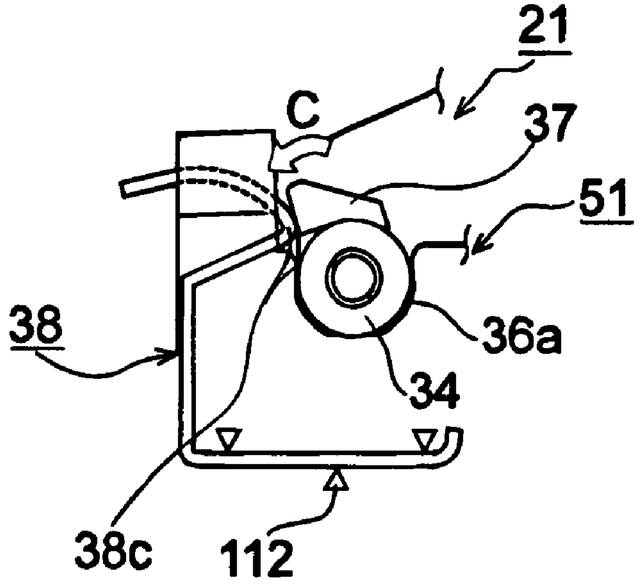
FIG. 14 is a schematic enlarged view No. 1 showing the method of detaching the belt unit from the printer according to the first embodiment of the present invention.
Figure 15:
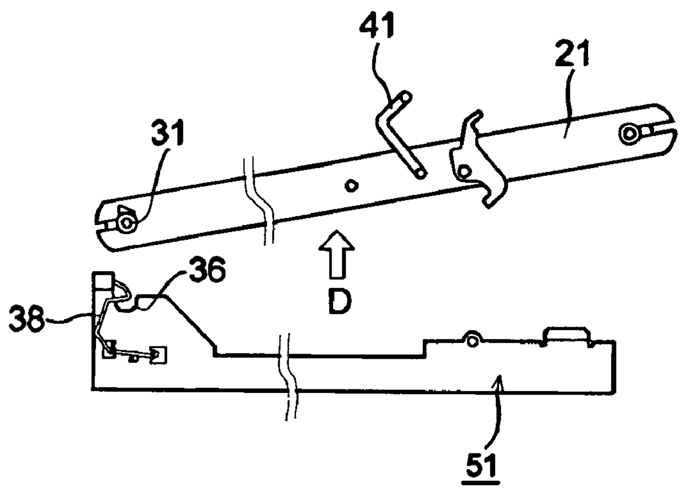
FIG. 15 is a schematic front view No. 3 showing the method of detaching the belt unit from the printer according to the first embodiment of the present invention.
Figure 16:
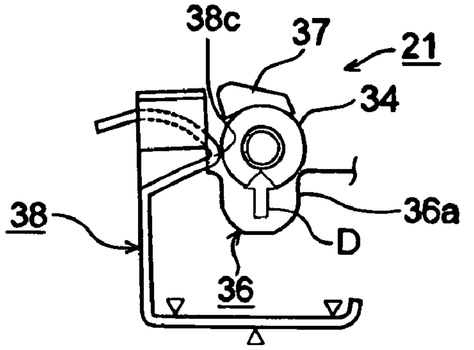
FIG. 16 is a schematic enlarged view No. 2 showing the method of detaching the belt unit from the printer according to the first embodiment of the present invention.

FIG. 12 is a schematic front view No. 1 showing the method of detaching the belt unit from the printer according to the first embodiment of the present invention. FIG. 13 is a schematic front view No. 2 showing a method of detaching the belt unit from the printer according to the first embodiment of the present invention. FIG. 14 is a schematic enlarged view No. 1 showing the method of detaching the belt unit from the printer according to the first embodiment of the present invention. FIG. 15 is a schematic front view No. 3 showing the method of detaching the belt unit from the printer according to the first embodiment of the present invention. FIG. 16 is a schematic enlarged view No. 2 showing the method of detaching the belt unit from the printer according to the first embodiment of the present invention.

As shown in FIG. 12, first, the operator rotates the lock member 45 in an arrow direction to unlock the belt unit 21 from the frame 51. When the operator holds and lifts the handle 41 of the belt unit 21, the handle 41 rotates around the end portions 41*a* and 41*b* (FIG. 6). Then, the handle 41 stops when a space between the handle portion 41*c* and a position of the belt unit 21 where the sheet passes through becomes a maximum level.

Afterward, as shown in FIG. 13, the belt unit 21 is inclined around the shaft 31 in an arrow direction C, the protruding member 37 rotates in an arrow direction C to push the peak 38*c* as shown in FIG. 14. Accordingly, the spring 38 elastically deforms around the supporting portion 112 in the arrow direction C. When the space between the peak 38*c* and the wall surface 36*a* becomes equal to the outer diameter of the bearing 34, the belt unit 21 is lifted in an arrow direction D to detach from the frame 51 as shown in FIGS. 15 and 16.

As described above, in the embodiment, when the operator holds the handle 41 and lifts the belt unit 21 so that the bearings 34 enter the bearing receiving portions 36 of the frame 51, the springs 38 are pushed out of the bearing receiving portions 36. Then, the bearings 34 are retained in the bearing receiving portions 36 with the restoration force of the springs 38. Accordingly, it is easy to attach the belt unit 21 to the frame 51. Further, when the operator holds the handle 41 and rotates the belt unit 21 around the shaft 31, the protruding member 37 pushes the spring 38 out of one of the bearing receiving portions 36. Accordingly, it is easy to detach the belt unit 21 from the frame 51.

Second Embodiment

A second embodiment of the present invention will be explained next. Components in the second embodiment similar to those in the first embodiment are designated with the same reference numerals, and explanations thereof are omitted. The components similar to those in the first embodiment provide the similar effects.

Figure 17:
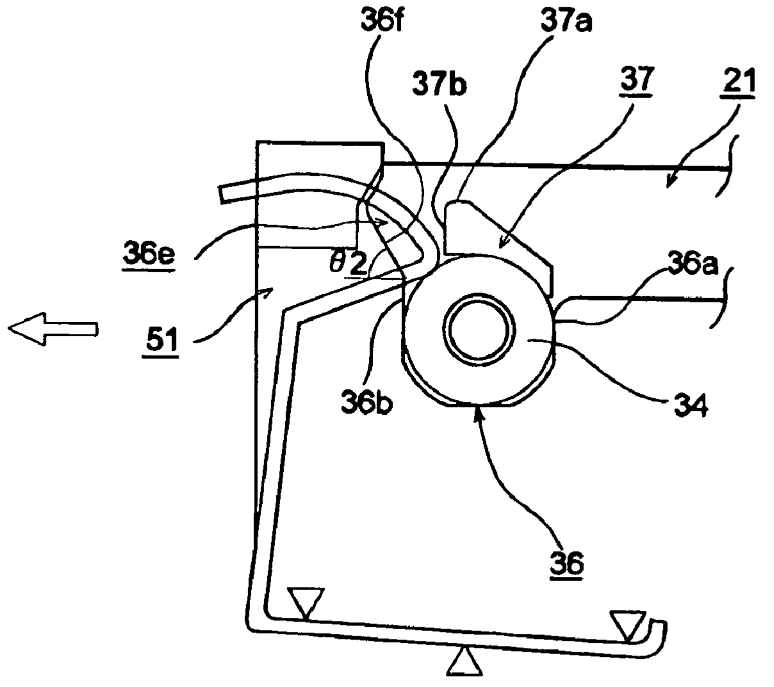
FIG. 17 is a schematic enlarged view showing a belt unit in an attached state according to a second embodiment of the present invention.

FIG. 17 is a schematic enlarged view showing a belt unit in an attached state according to the second embodiment of the present invention.

As shown in FIG. 17, the bearing receiving portion 36 has wall surfaces 36*a* and 36*b*, and the wall surface 36*b* at the side of the fixing device 65 (FIG. 3) extends upward. A recess portion 36*e* is formed in the wall surface 36*b* at a position facing the protruding member 37 as a pressing device when the belt unit 21 is attached to the frame 51. A curved portion 37*a* as a chamfered portion is formed on an upper end portion of the protruding member 37 at the side of the fixing device 65.

In the embodiment, a tapered surface 36*f* of the recess portion 36*e* as a supporting surface is inclined at an angle (inclined angle) θ2 at greater than 30° and less than 60° relative to the horizontal direction. When the tapered surface 36*f* is inclined at the inclined angle θ2 of less than 30°, it is difficult to lift the belt unit 21 unless the belt unit 21 is inclined up to a nearly perpendicular state. When the tapered surface 36*f* is inclined at the inclined angle θ2 of greater than 60°, the protruding member 37 receives a small reactive upward force from the tapered surface 36*f* when the belt unit 21 is inclined and lifted, thereby making it difficult to detach the belt unit 21.

A method of detaching the belt unit 21 from the printer 11 will be explained next. A method of attaching the belt unit 21 to the printer 11 is similar to that in the first embodiment, and explanation thereof is omitted.

Figure 18:
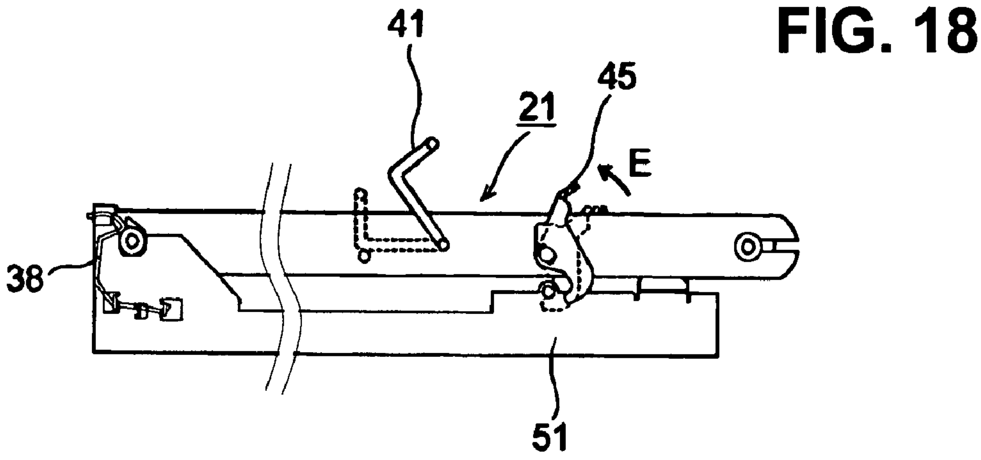
FIG. 18 is a schematic front view No. 1 showing a method of detaching the belt unit from the printer according to the second embodiment of the present invention.
Figure 19:
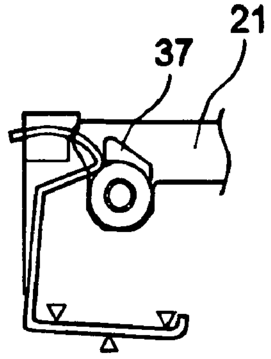
FIG. 19 is a schematic enlarged view No. 1 showing the method of detaching the belt unit from the printer according to the second embodiment of the present invention.
Figure 20:
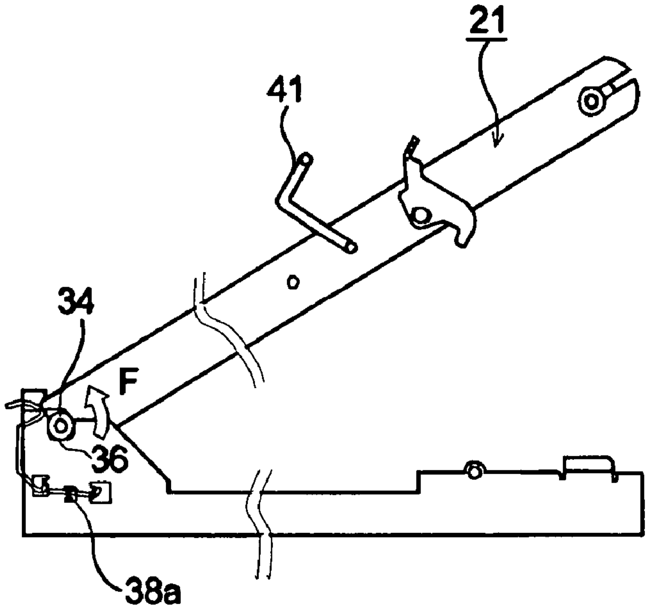
FIG. 20 is a schematic front view No. 2 showing the method of detaching the belt unit from the printer according to the second embodiment of the present invention.
Figure 21:
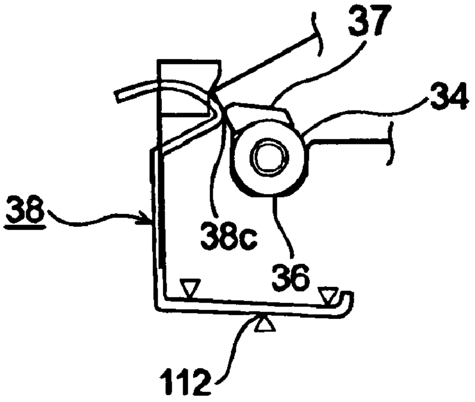
FIG. 21 is a schematic enlarged view No. 2 showing the method of detaching the belt unit from the printer according to the second embodiment of the present invention.
Figure 22:
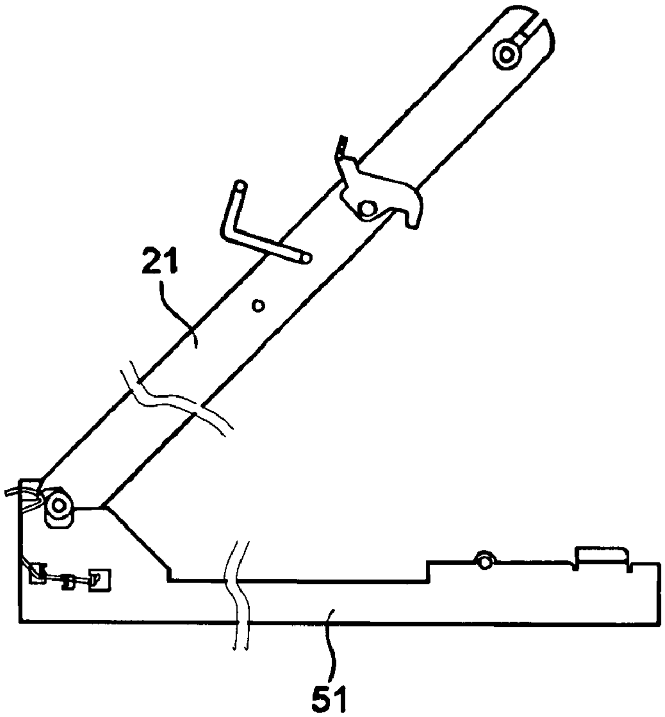
FIG. 22 is a schematic front view No. 3 showing the method of detaching the belt unit from the printer according to the second embodiment of the present invention.
Figure 23:
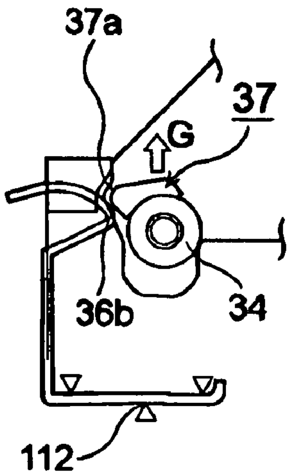
FIG. 23 is a schematic enlarged view No. 3 showing the method of detaching the belt unit from the printer according to the second embodiment of the present invention.

FIG. 18 is a schematic front view No. 1 showing the method of detaching the belt unit 21 from the printer 11 according to the second embodiment of the present invention. FIG. 19 is a schematic enlarged view No. 1 showing the method of detaching the belt unit 21 from the printer 11 according to the second embodiment of the present invention. FIG. 20 is a schematic front view No. 2 showing the method of detaching the belt unit 21 from the printer 11 according to the second embodiment of the present invention. FIG. 21 is a schematic enlarged view No. 2 showing the method of detaching the belt unit 21 from the printer 11 according to the second embodiment of the present invention. FIG. 22 is a schematic front view No. 3 showing the method of detaching the belt unit 21 from the printer 11 according to the second embodiment of the present invention. FIG. 23 is a schematic enlarged view No. 3 showing the method of detaching the belt unit 21 from the printer 11 according to the second embodiment of the present invention.

As shown in FIG. 18, first, the operator rotates the lock member 45 in an arrow direction E to unlock the belt unit 21 from the frame 51. As shown in FIG. 20, when the operator holds the handle 41 and rotates the belt unit 21 around the bearing receiving portions 36 in an arrow direction F, the protruding member 37 in a state shown in FIG. 19 pushes the peak 38*c* as shown in FIG. 21. Accordingly, the spring 38 deforms elastically around the supporting portion 112 as a pivot.

When the belt unit 21 is inclined further, the front end of the protruding member 37 enters the recess portion 36*e* (FIG. 17) and contacts with the tapered surface 36*f*. As shown in FIG. 22, when the belt unit 21 is inclined further, the belt unit 21 is lifted from the frame 51 in an arrow direction G with the curved portion 37*a* of the protruding member 37 as a pivot.

As described above, in the embodiment, when the belt unit 21 is inclined, the spring 38 is pushed out from the bearing receiving portion 36. When the belt unit 21 is inclined further, the belt unit 21 is lifted from the frame 51 with the curved portion 37*a* as a pivot. Accordingly, it is easy to detach the belt unit 21 from the frame 51.

In the embodiments described above, the printer is explained as the belt unit installed apparatus. The belt unit installed apparatus may be applicable to a copier, a facsimile, a multifunction device, and the like. Further, the belt unit installed apparatus is applied to the belt unit of a tandem type, and may be applicable to a belt unit of an intermediate transfer type.

The disclosure of Japanese Patent Application No. 2006-090115, filed on Mar. 29, 2006, is incorporated in the application.

While the invention has been explained with reference to the specific embodiments of the invention, the explanation is illustrative and the invention is limited only by the appended claims.

What is claimed is:

1. A belt unit installed apparatus comprising, an apparatus frame;

a belt unit attached to the apparatus frame, said belt unit having a first roller, a second roller, a belt placed between the first roller and the second roller, and a belt frame for supporting the first roller and the second roller;

an engaging member disposed on the belt frame for engaging the apparatus frame;

a receiving portion formed in the apparatus frame for engaging the engaging member;

an urging member disposed on the apparatus frame for urging the engaging member so that the engaging member maintains an engagement state relative to the receiving portion when the engaging member engages the receiving portion;

a protruding member disposed on the belt frame adjacent to the engaging member, said protruding member having a pressing portion for pressing the urging member away from the receiving portion when the belt unit is removed from the apparatus frame.

2. The belt unit installed apparatus according to claim 1, wherein said receiving portion includes a recess portion having an open end facing upward.

3. The belt unit installed apparatus according to claim 2, wherein said engaging member includes a first engaging member disposed at one end portion of the first roller and a second engaging member disposed at the other end portion of the first roller.

4. The belt unit installed apparatus according to claim 1, wherein said urging member extends into the receiving member.

5. The belt unit installed apparatus according to claim 1, wherein said urging member includes an elastic member having a free end portion, said free end portion having an inclined portion inclined toward a direction that the engaging member enters and extending into the receiving portion.

6. The belt unit installed apparatus according to claim 5, wherein said engaging member has a curved section having a curvature with a specific radius, said urging member extending into the receiving member within a range smaller than the radius.

7. The belt unit installed apparatus according to claim 5, wherein said urging member includes an urging portion disposed at a lower end portion of the inclined portion and extending into the receiving portion, said urging portion having a shape pressing the engaging member into the receiving portion when the engaging member is fitted to the receiving portion.

8. The belt unit installed apparatus according to claim 1, wherein said belt frame further includes a lock member arranged to be rotatable around a shaft attached to the belt frame, said lock member having a first engaging portion at a first end portion thereof for engaging a second engaging portion disposed on the apparatus frame and a knob portion at a second end portion thereof to be operated by an operator.

9. The belt unit installed apparatus according to claim 8, wherein said first engaging portion is adopted to engage the second engaging portion when the knob portion is pushed down and disengage from the second engaging portion when the knob portion is lifted.

10. The belt unit installed apparatus according to claim 8, wherein said first engaging portion is formed of a hook portion and said second engaging portion is formed of a pin portion.

11. The belt unit installed apparatus according to claim 1, further comprising a supporting portion disposed adjacent to the receiving portion for contacting with the protruding member when the belt unit is removed from the apparatus frame.

12. The belt unit installed apparatus according to claim 11, wherein said protruding member further includes a protruded portion adjacent to the pressing portion for contacting with the supporting portion when the belt unit is removed from the apparatus frame.

13. The belt unit installed apparatus according to claim 11, wherein said supporting portion extends at a specific angle in a range of 30° to 60° relative to a horizontal direction.

14. The belt unit installed apparatus according to claim 3, wherein said first roller includes a drive roller for driving the belt unit, said second roller including a follower roller rotating accompanied with rotation of the first roller.

15. The belt unit installed apparatus according to claim 1, further comprising a handle disposed at a position closer to the second roller than a center between the first roller and the second roller.

16. The belt unit installed apparatus according to claim 15, further comprising a restriction member disposed on the belt frame for restricting movement of the handle.

17. The belt unit installed apparatus according to claim 1, wherein said engaging member includes a shaft supporting member for supporting the first roller to be freely rotatable.

18. An image forming apparatus comprising the belt unit installed apparatus according to claim 1 and an image forming unit for forming a developer image, said image forming unit being arranged adjacent to the belt unit so that the belt unit transports a recording medium and transfers the developer image to the recording medium.

19. The image forming apparatus according to claim 18, wherein said belt unit further includes a handle having an arm member disposed on the belt frame to be rotatable and extending along the belt frame, and a hand hook portion connected to the arm member and extending in a width direction of the belt; and a restriction member disposed on the belt frame for restricting movement of the handle, said hand hook portion being situated away from the belt by a specific distance in a space between the image forming unit and the belt unit.

20. A method of installing/removing a belt unit to and from an apparatus frame, comprising the steps of:

pressing a shaft supporting member disposed on the belt unit on an urging member extending into a receiving portion disposed on the apparatus frame against urging force of the urging member to expand an opening of the receiving portion;

inserting the shaft supporting member into the receiving portion while the shaft supporting member receives the urging force of the urging member when the opening becomes a size equal to an outer diameter of the shaft supporting member;

setting the shaft supporting member in the receiving portion so that the urging member abuts against and presses the shaft supporting member into the receiving portion;

lifting a handle disposed on the belt unit so that the belt unit becomes an inclined state;

abutting a protruding member disposed on the belt unit against the urging member as the belt unit is inclined;

moving the urging member away from the opening of the receiving portion with the protruding member as the belt unit is inclined further; and lifting and removing the belt unit from the a apparatus frame when the opening becomes a size equal to the outer diameter of the shaft supporting member.

* * * * *